F. Le Roy Senour.
Hoe and Rake.
N° 90,691. Patented Jun. 1, 1869.
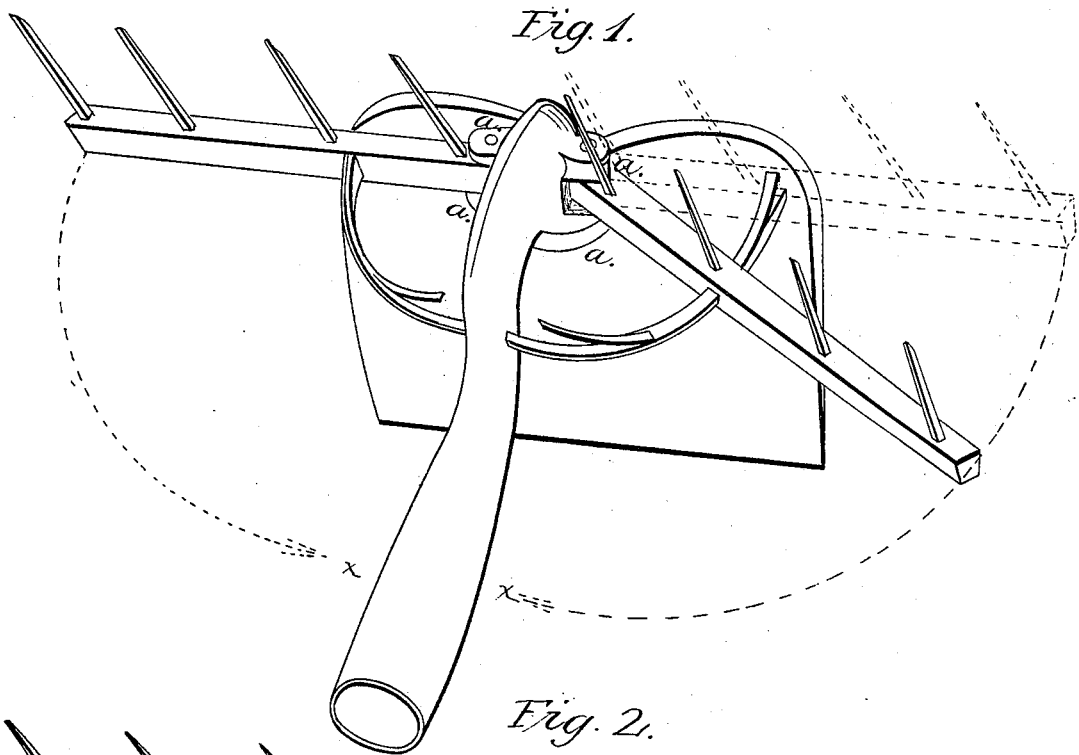
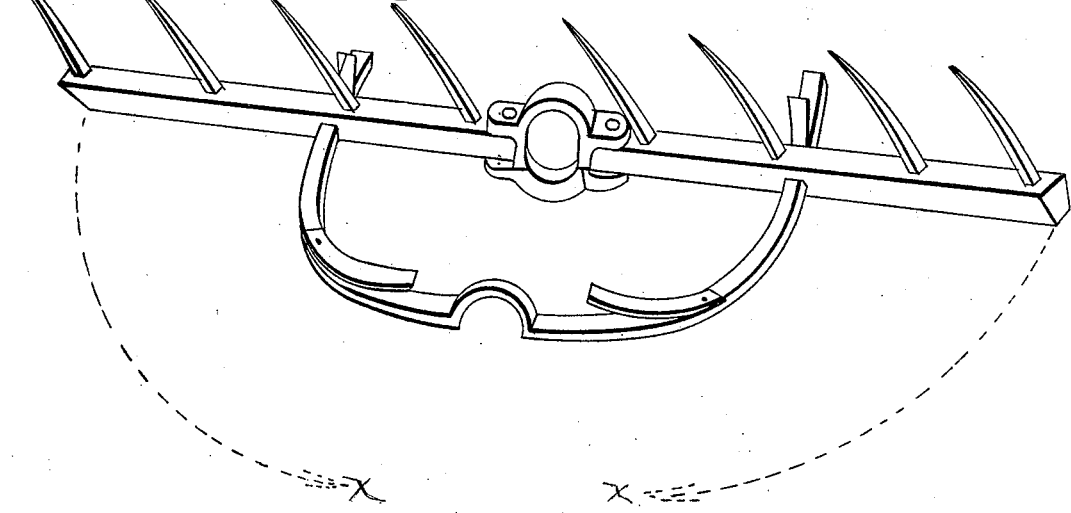
Witnesses:                                   Inventor:

F. LE ROY SENOUR, OF EATON, OHIO.

Letters Patent No. 90,691, dated June 1, 1869.

IMPROVEMENT IN COMBINED HOE AND RAKE.

The Schedule referred to in these Letters Patent and making part of the same.

*To all whom it may concern:*

Be it known that I, F. LE ROY SENOUR, of Eaton, in the county of Preble, in the State of Ohio, have invented a Combination Hoe and Rake; and I do hereby declare that the following is a full and exact description thereof, reference being had to the accompanying drawings, and to the letters of reference marked thereon.

To enable others skilled in the art to make and use my invention, I will proceed to describe its construction and operation.

I construct the hoe in the ordinary manner, except, at the point where the handle touches the hoe, I construct four flanges, as marked by the letter $a$, in the accompanying drawings, Figure 1.

I then construct two sections or parts of the rake, marked $b$ in the drawings, so as to fit between the flanges, marked $a$.

An end of each section of the rake is then inserted between the flanges, on each side of the handle, and fastened by a rivet passing through the flanges and the ends of the sections of the rake, so as to form a hinge, thus enabling me to open the rake parallel with the upper part of the hoe, or to bring the sections of the rake parallel with the handle, so that I can use either the hoe or the rake.

The semicircular line, marked $c$ in fig. 1, represents a metallic rod, passing through the handle of the hoe, and through each section of the rake, and fastened at the top of the hoe.

The sections of the rake swing over or along this rod, and are fastened, when opened or shut, at the points marked $d$, and by four springs marked $d'$.

Figure 2 represents the rake constructed, in every respect, similar to that of fig. 1, as above described, except the flanges, marked H, are made in two sections, separate from the handle of the hoe, and made to fit any handle, thus enabling me to adjust the rake to any hoe not made expressly for the rake-adjustment.

What I claim as my invention, and desire to secure by Letters Patent, is—

1. The described construction of the rake, in such manner that it will fold, as set forth.

2. The combination of a rake thus constructed, with a hoe, in the manner set forth.

F. LE ROY SENOUR.

Witnesses:
W. A. EIDSON,
W. H. H. DELPOOT.